United States Patent Office 3,430,345
Patented Mar. 4, 1969

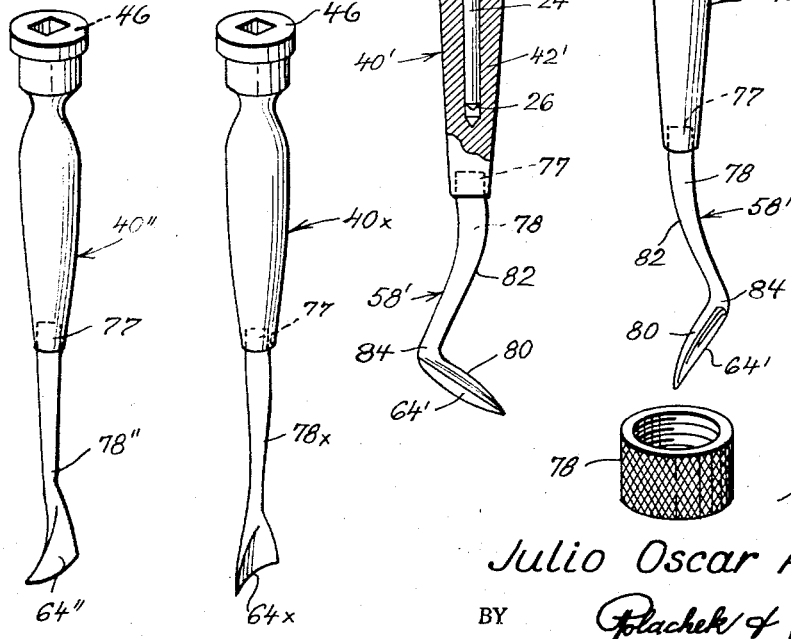

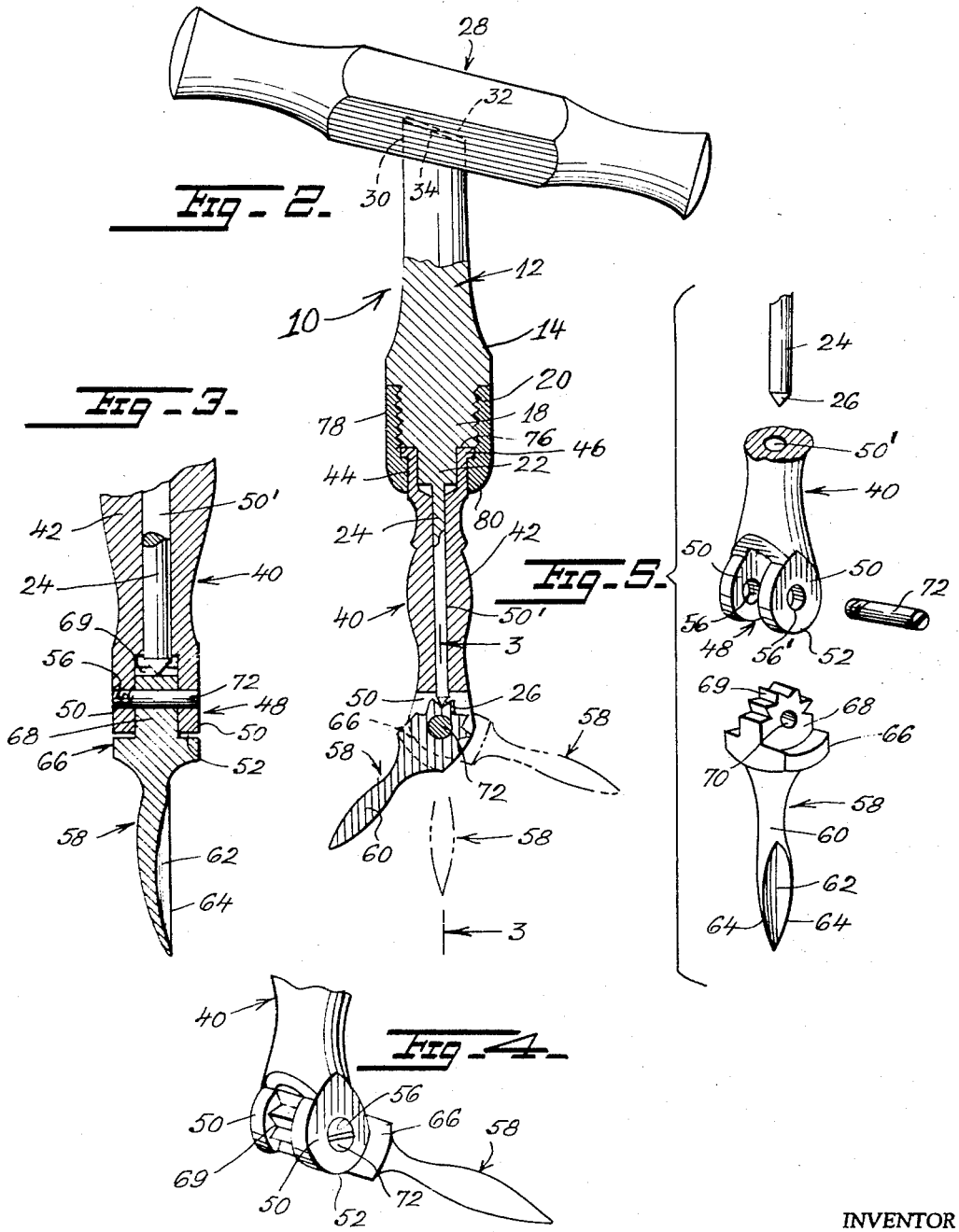

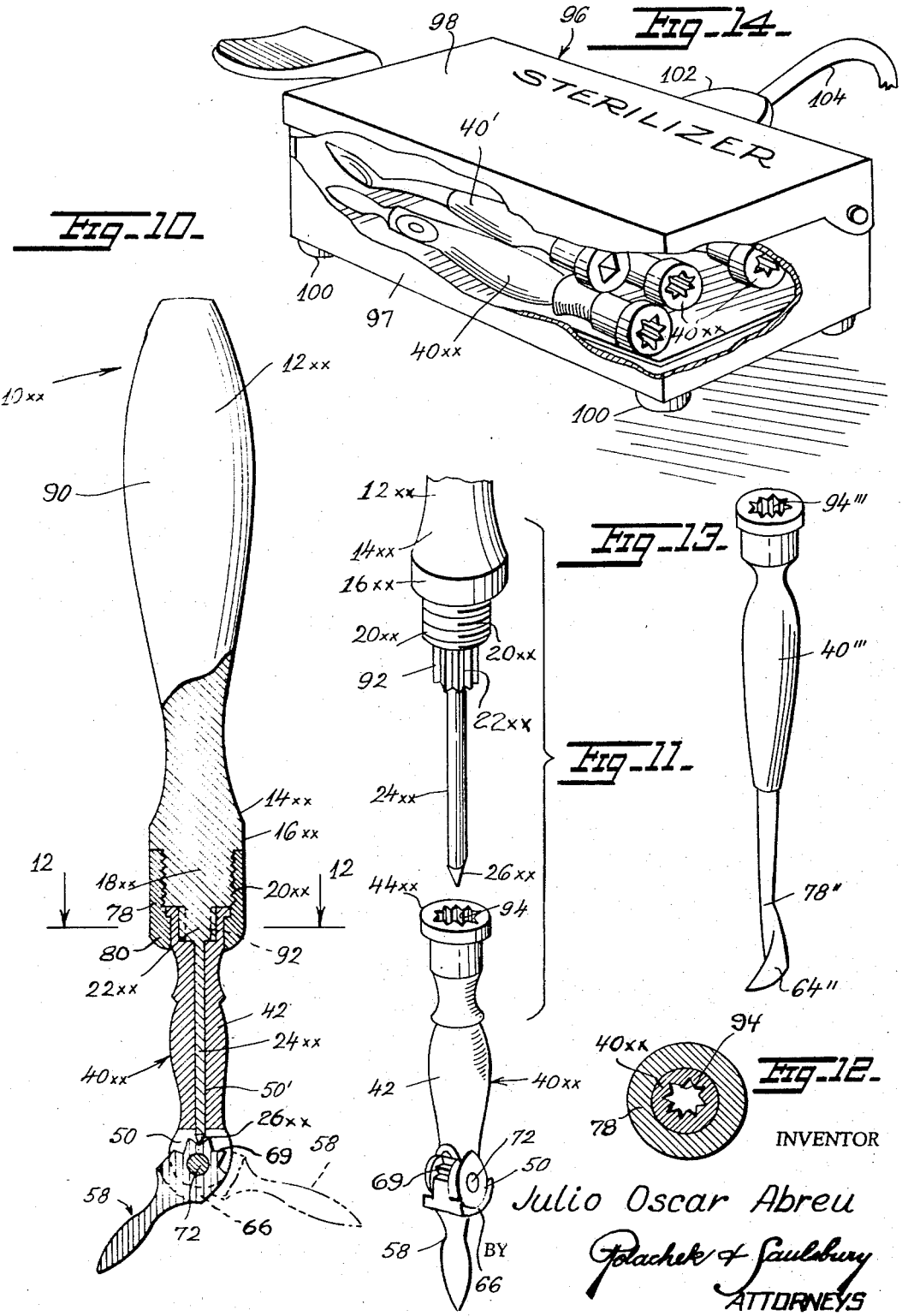

3,430,345
HOLDER FOR DENTIST'S INSTRUMENTS
Julio Oscar Abreu, 312 Brinsmade Ave.,
Bronx, N.Y. 10465
Filed Dec. 19, 1966, Ser. No. 608,233
U.S. Cl. 32—46
Int. Cl. A61c 3/02
2 Claims

ABSTRACT OF THE DISCLOSURE

A dental instrument having a common cross handle into which a variety of tools may be interchangeably and selectively fitted. The handle is socketed to removably receive one end of an elongated body formed with a depending rod. Another elongated body fits over the depending rod, and a knife device is movably mounted on the bottom end of the other body. Means is provided for joining the bodies.

---

This invention relates generally to dental instruments and more particularly to operative tools such as curettes, broaches and the like, having a common handle or holder into which a variety of tools may be interchangeably and selectively secured.

An important object of the invention is to provide a common handle or holder with means for forming a rigid joint between the handle or holder and the operative tool.

An object of the invention is to provide a handle or holder of this kind with a rigid extension for rigidifying the operative tool and joint between the handle or holder and tool.

Another object of the invention is to provide an improved operating tool adjustable by the operator to any desired angle and in a definite plane.

Still another object of the invention is to provide a dental instrument in which the tool element is separable from the handle thereby allowing a large number of tool elements to be cleaned at any one time in the sterilizer and lessening the required size for dentist's sterilizers.

For further comprehension of the invention and of the objects and advantages thereof, reference will be had to the following detailed description and accompanying drawings and to the appended claims in which the various novel features of the invention are more particularly set forth.

In the accompanying drawings forming a material part of this disclosure:

FIG. 1 is a side elevational view of a dental instrument embodying my invention.

FIG. 2 is a similar view partly in vertical section, showing the operative tool moved to adjusted position in solid lines and in dash lines from the straight position shown in FIGURE 1, on an enlarged scale.

FIG. 3 is a fragmentary sectional view of the bottom end of the instrument, on a still larger scale.

FIG. 4 is a perspective bottom view of the operative tool shown moved to an adjusted position.

FIG. 5 is a disassembled perspective view of the parts shown in FIGS. 3 and 4.

FIG. 6 is a part sectional and part elevational view of the bottom end of the tool handle or holder of FIG. 1 with a non-adjustable operative tool connected thereto.

FIG. 7 is a disassembled perspective view of the parts shown in FIG. 6.

FIG. 8 is a perspective view of another form of similar operative tool adapted to be connected to the handle or holder shown in FIG. 1.

FIG. 9 is a similar view of still another form of similar operative tool adapted to be connected to the handle or holder shown in FIG. 1.

FIG. 10 is an elevational view similar to FIG. 2 but showing a different shaped tool handle and an adjustable operative tool with splines or serrations for connecting the tool to the handle.

FIG. 11 is a disassembled perspective view of the parts shown in FIG. 10.

FIG. 12 is a cross-sectional view taken on line 12—12 of FIG. 10.

FIG. 13 is a perspective view of a serrated operative tool adapted to be connected to the holder of FIG. 10, and FIG. 14 is a front perspective view of a small size sterilizer with a plurality of the handle less operative tools stored therein, parts thereof being broken away to show the tools.

Referring now in detail to the various views of the drawings, particularly to FIGS. 1 and 2, a dentist's instrument embodying the invention is illustrated and designated generally at 10. The instrument 10 comprises a solid cylindrical body 12, its outer surface curving downwardly and outwardly adjacent its bottom end, as indicated at 14, the bottom end being straight as indicated at 16 and terminating in an extension 18 of reduced diameter. The extension 18 is formed with external screw threads 20. The extension continues into a downwardly extending hub portion 22 square in cross section and of further reduced diameter. A downwardly-extending elongated round rod 24 is formed integrally with the hub portion 22 and has a tapered bottom end 26. The body, extension, hub portion and rod are integrally formed in one-piece of hard suitable metal.

An elongated substantially-cylindrical solid metal handle 28 is disposed across the top of the body 12 and is formed with a plain cylindrical socket 30 midway its ends to receive the top end of the body 12. The socket is formed with a slanting base 32 to receive the slanting edge 34 of the top of the body 12 so that the handle 28 is disposed at a slight angle to the horizontal as viewed in FIGS. 1 and 2.

In using my improved dental instrument, a suitable operative tool such as a curette or broach 40 is removably and operatively connected to the body 12 of the tool 10 as shown in FIGS. 1 and 2. The curette or broach 40 is formed with an elongated solid cylindrical body 42 slightly curved on its outer surface and terminating at its top end in a cylindrical plain socket 44 with an annular flange 46 therearound. The other end of the body has a straight cylindrical surface and is bifurcated as indicated at 48. An axial passage 50' connects the top socket 44 with the bifurcated end 48. The bifurcations 50, 50 of the bifurcated end are flat on the outer surfaces and oval in shape with curved bottom end faces 52. The bifurcations are formed with aligned holes 56, 56', the hole 56 being threaded.

A knife element 58 is pivotally and adjustably connected to the bifurcations 50, 50 normally forming an extension of the body of the tool. The knife element 58 includes a cylindrical pointed shank portion 60 dished as indicated at 62 forming cutting edges 64 extending from the extreme pointed end to a point midway the length of the shank portion 60. The other end of the shank portion is formed with a curved cradle portion 66 with a segment of a gear 68 formed centrally thereof. A hole 70 extends centrally through the gear segment. The gear segment is fitted between the bifurcations 50 with the hole 70 thereof aligned with the holes 56, 56' in the bifurcations. A pivot screw pin 72 extends through the aligned holes and threaded with hole 56 thereby pivotally mounting the knife element 58 with the teeth 69 on the gear segment 68 meshing with the handle rod tapered end 26 between the bifurcations 50 on the bottom end of the body of the operative tool 40 as best seen in FIG. 2.

In assembling the curette or broach tool 40 and the body 12 of the instrument, the elongated rod 24 of the body 12 of the instrument is inserted through the passage 50' in the body 42 of the tool until the tapered end 26 thereof intersects the teeth 69 on the gear segment 68, and until the shoulder 76 formed by the reduced portion 18 of the body 12 and the hub portion 22 thereof seats on the annular flange 46 of the tool as shown in FIG. 2. A sleeve 78, internally threaded and knurled on the outside with an inwardly directed flange 80 on one end thereof, is then slipped over the tool and threaded onto the external threads 20 on the reduced portion 18 of the body 12 until the flange 80 on the sleeve 78 impinges against the bottom surface of the annular flange 46 on the tool as shown in FIG. 2. The rod 24 in addition to rigidifying the tool 40 serves to hold the knife device 58 in moved adjusted position.

By reason of the pivotal mounting of the knife element 58, the dentist is enabled to adjust the working end of the knife element angularly with respect to the body 42 of the tool 40 to suit various situations in which the tool is to be used, thereby making a single tool fulfill the functions of many tools.

The sleeve 78 in addition, to furnishing a coupling means between the tool and instrument, affords a quick and a convenient means for selectively changing one tool for another tool while a dental operation is in progress and it necessitates the provision of but one handle or holder for a number of tools from which the selection may be made, such as the modified form of curette or broach 40' shown in FIG. 6, the modified form of curette or broach 40" shown in FIG. 8, and the modified form of curette or broach 40x shown in FIG. 9. These operative tools will take up less space in a sterilizer than the dentist's tool with integral handles and sterilizers may be made of less capacity, if desired.

The tool 40' of FIG. 6 differs from the tool 40 of FIG. 1 in that the body 42' is tapered instead of being curved and terminates at the bottom in a center socket 77 instead of a pivotal knife device such as the knife element 58 of the tool 40 of FIG. 1. A non-adjustable knife or cutter device 58' has one end of its shank portion 78 fitted in the socket 77, the other end of the shank portion being formed with an angular dished cutting end 80 having cutting edges 64'. The shank portion 78 is bent midway its ends as indicated at 82 and the angular cutting end 80 is oppositely bent from the shank portion as indicated at 84.

The tools 40" and 40x shown in FIGS. 8 and 9, respectively, differ from the tool 40' of FIG. 6 merely in that the shank portion 78" or 78x of non-adjustable knife or cutter device 58" or 58x respectively, is straight and not bent, and the cutting end of tool 40" includes a hooked cutting edge 64" and the cutting end of tool 40x includes a flared cutting edge 64x instead of a dished cutting end.

The improved instrument 10 permits the dentist to adjust the instrument by manually pivoting the knife device 58 upon the rod 24 and body 12 and sleeve 78 raised upwardly relative to the body 42 of the tool 40, the hub portion 22 sliding in the socket 44 of the body 42. The socket 48 in the handle 28 permits this operation. The body 12 and rod 24 then drop by gravity into the groove between the teeth 69 holding the knife element 58 in moved adjusted position. The dentist is thus enabled to adjust the position of the knife element 58 with respect to the body 42 of the tool 40 to suit various situations in which the tool is to be used, thereby making a single tool fulfill the functions of many tools. The knife element is rigidly held thereby with relation to its body 42 and handle body 12 to provide a unitary dentist instrument 10.

In FIGS. 10 to 12 inclusive, another modification of the invention is illustrated. Herein a dentist's instrument 10xx comprises an elongated solid cylindrical round handle 12xx with a bulged hand gripping portion 90. The body of the handle adjacent the bottom curves outwardly as indicated at 14xx merging into a straight bottom end 16xx formed with an extension 18xx of reduced diameter. This extension 18xx has external screw threads 20xx, and continues into a downwardly extending hub portion 22xx generally round in cross-section and formed with splines or serrations 92 on its outer surface. A downwardly-extending elongated round rod 24xx is formed integrally with the hub portion 22xx and a tapering bottom end 26xx. The body, extension, hub portion and rod are formed in one-piece of suitable rigid material such as stainless steel.

An operative tool 40xx somewhat similar to the tool 40 of FIG. 1 is shown attached to the instrument 10xx. The operative tool 40xx differs from the tool 40 in that a round socket 44xx at the top end of the tool is formed with internal splines or serrations 94 to accommodate the external serrations 92 on the hub portion 22xx of the body of the handle 12xx. In all other respects, the tool 40xx and connections to handle 92 are similar to the tool 40 and its connection to body 12 and similar reference numerals are used to indicate similar parts throughout.

In FIG. 13, the modified form of tool 40''', is similar to the tool 40" shown in FIG. 8 except that the socket 40''' at the top of the body thereof is round and formed with internal serrations 94''' to receive the external serrations 92 of the holder 12 of FIG. 10.

By the use of the serrations on the handles and in the operative tools, a small angular adjustment of the tool can be about the axis of the handle to point the knife end differently and best suited to the work to be performed by the dentist.

By making the bodies 12 and 12xx of the instruments detachable, the tools used with such bodies when detached may be placed in a small sterilizer 96 shown in FIGURE 14. The sterilizer has a rectangular box-like body 97 with hinged cover or lid 98. The box-like body has corner feet 100. The dimensions of the body are such as to receive a plurality of tools in side-by-side relation for sterilizing purposes. This sterilizer 96 is provided with a plug 102 and cable 104 for connection to an electric source.

What is claimed is:

1. A device of the kind described comprising in combination an elongated cross handle having a socket therein, a first elongated cylindrical body having one end slidably seated in said socket, the other end of said body having a depending reduced end portion, a hub portion of smaller diameter than the reduced end portion depending from said reduced end portion, an integral rod depening from the bottom end of said hub portion, a second elongated cylindrical body slidably mounted on said hub portion of the first cylindrical body, said second cylindrical body having an axial passage fittingly receiving said depending rod, a knife device movably mounted on the bottom end of said second cylindrical body and means for detachably joining said first and second bodies, the lower end of the second cylindrical body being bifurcated, said knife device having a shank portion with spaced knife edges at the lower end thereof, and with a curved saddle at the other end, a gear segment integral with said saddle and extending outwardly thereof, said gear segment disposed between the bifurcations of the bifurcated end of the second cylindrical body, said integral rod of the first body portion meshing with the teeth on the gear segment of the knife device, said bifurcations and gear segment having aligned holes therein, and a pivot pin extending through said aligned holes whereby the knife device is pivotally mounted.

2. A device of the kind described as defined in claim 1 wherein the bottom end of the rod is tapered and normally extends in a groove between a pair of adjacent teeth on the gear segment for holding the knife device in moved adjusted positon.

References Cited

UNITED STATES PATENTS

| | | | |
|---|---|---|---|
| 649,234 | 5/1900 | Chiavaro | 32—40 XR |
| 984,778 | 2/1911 | Remisch | 7—14.55 |
| 1,177,604 | 4/1916 | Cowell | 7—16 XR |
| 1,247,707 | 11/1919 | Morich | 7—16 |
| 1,290,018 | 12/1918 | Goodwin | 306—7 XR |
| 1,594,459 | 8/1926 | Hromas | 306—9 XR |
| 2,056,417 | 10/1936 | Bosworth | 32—46 |

ROBERT PESHOCK, *Primary Examiner.*